United States Patent Office 3,810,983
Patented May 14, 1974

3,810,983
PESTICIDAL COMPOSITIONS AND METHODS OF KILLING PESTS USING O-ALKYL-S-(β-ALKOXY-ETHYL) - S - (ALKOXY OR PHENOXY-ALKYL) PHOSPHORO DITHIOLATES
Shigeo Kishino, Tokyo, and Akio Kudamatsu and Kozo Shiokawa, Kanagawa, Japan, assignors to Bayer Aktiengesellschaft, Leverkusen, Germany
No Drawing. Original application Nov. 8, 1971, Ser. No. 196,748. Divided and this application Nov. 10, 1971, Ser. No. 197,522
Claims priority, application Japan, Nov. 18, 1970, 45/100,996
Int. Cl. A01n 9/36
U.S. Cl. 424—217                     9 Claims

ABSTRACT OF THE DISCLOSURE

O-alkyl-S-(β-alkoxyethyl)-S-(alkoxy or phenoxyalkyl) phosphoro dithiolates of the general formula

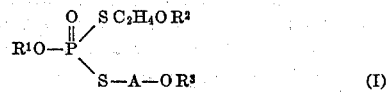

in which $R^1$ is methyl or ethyl, $R^2$ is lower alkyl,
$R^3$ is lower alkyl or

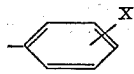

wherein $n$ is 0 to 3 and
X is halogen, lower alkyl or nitro, and
A is lower alkylene, which possess insecticidal, acaricidal and nematocidal properties.

This application is a division of application Ser. No. 196,748, filed Nov. 8, 1971, now pending.

The present invention relates to and has for its objects the provision of particular new O-alkyl-S-(β-alkoxyethyl)-S-(alkoxy or phenoxy-alkyl)phosphoro dithiolates wherein the phenyl radical, if present, may be substituted by up to three halogen, alkyl or nitro groups, which possess insecticidal, acaricidal and nematocidal properties, active compositions in the form of mixtures of such compounds with solid and liquid dispersible carrier vehicles, and methods for producing such compounds and for using such compounds in a new way especially for combating pests, e.g. insects, acarids and nematodes, with other and further objects becoming apparent from a study of the within specification and accompanying examples.

From the specification of Dutch Pat. No. 67/17383 it is known that the compound of the formula

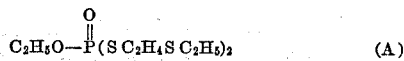

has insecticidal and fungicidal activities.

The present invention provides, as new compounds, the phosphoric acid esters of the general formula

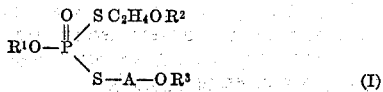

in which $R^1$ is methyl or ethyl, $R^2$ is lower alkyl,
$R^3$ is lower alkyl or

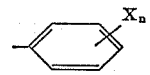

wherein $n$ is 0 to 3 and
X is halogen, lower alkyl or nitro, and
A is lower alkylene.

These new compounds have been found to possess excellent insecticidal, acaricidal and nematocidal properties.
Preferably, in the above formula (I), $R^1$ is methyl or ethyl, $R^2$ is $C_1$–$C_4$ alkyl namely methyl, ethyl, n- or isopropyl or n-, iso-, sec.- or tert.-butyl, $R^3$ is $C_1$–$C_4$ alkyl, phenyl or phenyl substituted by chlorine, bromine, $C_1$–$C_4$ alkyl or nitro, and A is methylene, ethylene, propylene, trimethylene or tetramethylene.

The present invention also provides a process for the preparation of a compound of the Formula I above, in which (a) a dithiophosphate of the general formula

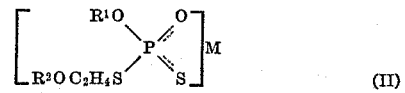

in which

M is a metal equivalent or an ammonium group is reacted with a halide of the general formula

in which

Hal is halogen, preferably chlorine or bromine, or (b), as a preferred alternative in those cases where $R^3$ is identical to $R^2$ and A is ethylene, a mercaptan of the general formula $$HSC_2H_4OR^2 \qquad (IV)$$

is reacted, in the form of a metal or ammonium salt thereof or in the presence of an acid-binding agent, with a phosphoric acid ester dichloride of the general formula

In the foregoing Formulas II to V, $R^1$, $R^2$, $R^3$ and A have the meanings stated for Formula I.

Preferably, the reactants are used in substantially amounts shown in the below-mentioned reaction scheme.

In either of the process variants of this invention, the reaction is preferably carried out in the presence of a solvent or diluent. For this purpose, all inert solvents or diluents are suitable, especially water; aliphatic, alicyclic and aromatic optionally chlorinated hydrocarbons such as hexane, cyclohexane, petroleum ether, ligroin, benzene, toluene, xylenes, methylene chloride, chloroform, carbon tetrachloride, mono-, di- and tri-chloroethylenes and chlorobenzene; ethers, such as diethyl ether, methylethyl ether, di-isopropyl ether, dibutyl ether, ethylene oxide, dioxane and tetrahydrofurane; ketones, such as acetone, methylethyl ketone, methylisopropyl ketone, and methylisobutyl ketone; alcohols such as methanol, isopropanol, butanol and ethylene glycol; nitriles such as acetonitrile, propionitrile and acrylonitrile; esters such as ethyl acetate and amyl acetate; acid amides such as dimethyl formamide and dimethyl acetamide; and sulfones and sulfoxides such as dimethyl sulfoxide and sulfolane.

In either of the above process variants the reaction may be effected at temperatures within a fairly broad range: generally, the reaction is carried out at from above −20° C. to the boiling point of the reaction mixture, preferably at from about 0° to 100° C. or to the boiling point of the reaction mixture, whichever is the lower.

Both process variant (a) and process variant (b) are preferably carried out under atmospheric pressure, although it is possible to conduct either reaction under elevated or reduced pressure.

The reaction process variant (a) is illustrated by the following equation:

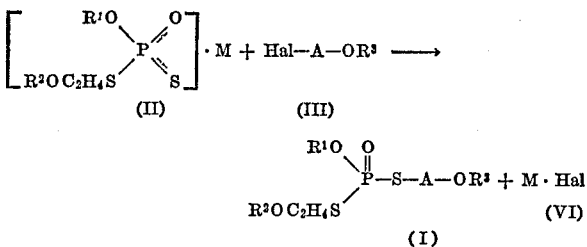

in which $R^1$, $R^2$, $R^3$, A and M have the meanings stated above. M is preferably ammonium or an alkali metal.

As examples of the dithiophosphates of the Formula II, there may be mentioned the potassium, sodium and ammonium salts of O-methyl-S-(β-ethoxyethyl)-dithiophosphoric acid,
O-ethyl-S-(β-methoxyethyl)-dithiophosphoric acid,
O-ethyl-S-(β-thoxyethyl)-dithiophosphoric acid,
O-ethyl-S-(β-isopropoxyethyl)dithiophosphoric acid and
O-ethyl-S-(β-n-butoxyethyl)-dithiophosphoric acid.

As examples of the halides of the Formula III, there may be mentioned 4-chlorophenoxymethyl chloride, 2,4-dichlorophenoxy methyl chloride, β-methoxyethyl chloride, β-ethoxyethyl chloride, β-isopropoxyethyl chloride, β-n-butoxyethyl chloride, β-phenoxyethyl chloride, β-(2-chlorophenoxy)ethyl chloride, β-(4-chlorophenoxy)-ethyl chloride, β - (2,4 - dichlorophenoxy)ethyl chloride, β-(2,4,5 - trichlorophenoxy)ethyl chloride, β - (4-tert.-butylphenoxy)ethyl chloride, β - (3-methyl-4-chlorophenoxy)ethyl chloride, β - (4-nitrophenoxy)ethyl chloride; γ-phenoxypropyl chloride and the corresponding bromides.

The reaction of process variant (b) is illustrated by the following equation:

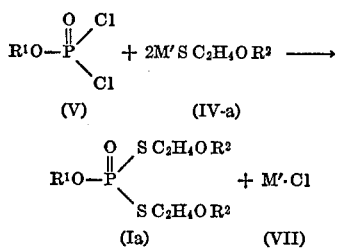

in which $R^1$ and $R^2$ have the meanings stated above, and M' is hydrogen, ammonium or a metal, preferably an alkali metal.

As examples of the phosphoric acid ester dichlorides of the Formula V, there may be mentioned O-methyl-phosphoric acid dichloride and O-ethylphosphoric acid dichloride. As examples of the mercaptans of the Formula IV, there may be mentioned β-methoxyethyl mercaptan, β - ethoxyethyl mercaptan, β - isopropoxyethyl mercaptan and β-n-butoxyethyl mercaptan; the sodium, potassium and ammonium salts of these mercaptans are also suitable.

As stated above, process variant (b) may be carried out in the presence of an acid-binding agent according to need. As the acid-binding agent there may be used a hydroxide, carbonate, bicarbonate or alcoholate of an alkali metal, or a tertiary amine, such as triethylamine, dimethylaniline or pyridine. When the reaction is carried out in the absence of an acid-binding agent, the intended product can be obtained by forming in advance a salt, preferably an alkali metal or ammonium salt, of the appropriate mercaptan and then reacting the salt with the appropriate O-alkyl phosphoric acid dichloride.

The compounds of this invention, as implied above, exhibit excellent biological activities against various harmful insects, spider mites and nematodes. Insecticidally, the compounds of this invention appear to be superior to the known compound of the Formula A given above and to other known compounds having similar directions of activity.

Furthermore, the active compounds of this invention exhibit only a very low toxicity towards warm-blooded animals and show no phytotoxicity towards cultivated plants. They are characterized by an activity that sets in quickly and that is long-lasting. Accordingly, they can be used for controlling harmful insects, such as biting and sucking insects, mites and nematodes in agriculture.

For instance, the active compounds of this invention are effective for controlling insects belonging to the Coleoptera such as the rice weevil (*Sitophilus oryzae*), flour beetle (*Tribolium castaneum*), twenty-eight-spotted lady beetle (*Epilachna vigintioctopunctata*), barley wireworm (*Agriotes fusicicollis*) and soy bean beetle (*Anomala rufocuprea*); insects belonging to the Lepidoptera such as the gypsy moth (*Lymantria dispar*), tent caterpillar (*Malacosoma neustria testacea*), common cabbageworm (*Pieris rapae crucivora*), cotton worm or tobacco cutworm (*Prodenia litura*), rice stem borer (*Chilo suppressalis*), smaller tea tortrix (*Adoxophyes orana*) and almond moth (*Ephestia cautella*); insects belonging to the Hemiptera such as the green rice leaf-hopper (*Nephotettix cincticeps*), brown planthopper (*Nilaparvata lugens*), comstock mealybug (*Pseudococcus comstocki*), arrowhead scale (*Unaspis yanonensis*), green peach aphid (*Myzus persicae*), apple aphid (*Aphis pomi*) and cabbage aphid (*Brevicoryne brassicae*); insects belonging to the Orthoptera such as the German cockroach (*Blattella germanica*) American cockroach (*Periplaneta americana*) and African mole cricket (*Gryllotalpa africana*); insects belonging to the Isoptera such as the Japanese termite (*Leucotermes speratus*); insects belonging to the Diptera such as the house fly (*Musca domestica vicina*), yellow-fever mosquito (*Aedes aegypti*), seed-corn maggot (*Hylemya platura*), northern house mosquito (*Culex pipiens*), Chinese malaria mosquito (*Anopheles sinensis*) and smaller house mosquito (*Culex tritaeniorchynchus*); mites such as the two spotted spider mite (*Tetranychus telarius*), citrus red mite (*Panonychus citri*) and Japanese citrus rust mite (*Aculus pelekassi*); and nematodes such as the southern root-knot nematode (*Meloidogyne incognita*), rice white-tip nematode (*Aphelenchoides besseyi*) and soy-bean cyst nematode (*Heterodera glicines*).

The active compounds according to the instant invention can be utilized, if desired, in the form of the usual formulations or compositions with conventional inert (i.e., plant compatible or herbicidally inert) pesticide diluents or extenders, i.e. diluents, carriers or extenders of the type usable in conventional pesticide formulations or compositions, e.g. conventional pesticide formulations or compositions such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as halogenated hydrocarbons, e.g. Freon; inert dispersible liquid diluent carriers, including inert organic solvents, such as aromatic hydrocarbons (e.g., benzene, toluene, xylene, dimethylnaphthalene, aromatic naphtha, etc.), halogenated, especially chlorinated, aromatic hydrocarbons (e.g., chlorobenzenes, etc.), aliphatic and alicyclic hydrocarbons, e.g. n-hexane, cyclohexane, gasolines for industrial use such as petroleum ether and solvent naphtha, and petroleum fractions such as paraffin wax, kerosene, light oil, middle oil and heavy oil, halogenated aliphatic hydrocarbons (e.g., methylene chloride, ethylene dichloride, carbon tetrachloride, trichloroethylene, ethylene dibromide, etc.), alcohols (e.g., methanol, ethanol, propanol, butanol, ethylene glycol, etc.), amines (e.g., ethanolamine, etc.), ethers, (e.g., ethyl ether, ethylene oxide, dioxane, etc.) ether-alcohols (e.g., glycol monomethyl ether, etc.), esters (e.g., ethyl acetate, amyl acetate, etc.), amides (e.g., dimethyl formamide, dimethyl acetamide, etc.), sulfoxides (e.g., dimethyl sulfoxide, etc.), ketones (e.g., acetone, isophorone, methyl ethyl ketone, cyclohexanone, etc.), and/or water; as well as inert dispersible finely divided solid carriers, such as vegetable powders, ground natural minerals (e.g., kaolins, clays, alumina, silica, chalk, i.e. calcium carbonate, talc, attapulgite, montmorillonite, kieselguhr, pyrophyllite, mica, gypsum, calcite, vermiculite, dolomite, muscovite, apatite, slaked lime, magnesium hydroxide, sulfur and pumice) and ground synthetic minerals (e.g., highly dispersed silicic acid) silicate, (e.g., alkali silicates, synthetic alumina, etc.), synthetic resins such as phenol, urea and vinyl chloride resins; whereas the following may be chiefly considered for use as conventional carrier vehicle assistants, e.g., surface-active agents, for this purpose: emulsifying agents, such as nonionic and/or anionic emulsifying agents (e.g., polyethylene oxide as well as ether and esters thereof such as polyoxyethylene esters of fatty acids such as sorbitan monolaurate polyethylene oxide ethers of fatty alcohols and alkyl phenols, alkyl sulfates such as sodium lauryl sulfate, alkyl sulfonates, aryl sulfonates, alkyl aryl sulfonates such as sodium alkyl naphthalene sulfonates, etc., and especially alkyl arylpolyglycol ethers, magnesium stearate, sodium oleate, etc.); cationic surfactants such as alkyl amines (e.g., lauryl amine, stearyl trimethyl ammonium chloride and alkyl dimethyl benzyl ammonium chloride) and polyoxyethylene alkyl amines; amphoteric surfactants; and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides, insecticides and nematocides, or fungicides, bactericides, rodenticides, herbicides, fertilizers, growth-regulating agents, or antiviral agents which classes of materials include organic phosphorus acid esters, carbamates, dithio-(or thiol-)carbamates, chlorinated organic compounds, dinitro compounds, organosulfur or organometal compounds, antibiotics, substituted diphenyl ethers, ureas and triazines.

The novel compounds may also be combined with adjuvants such as organic matter, stabilizers, adhesive agents, for example agricultural soap, calcium caseinate, sodium alginate, polyvinyl alcohol, detergents, coumarone (or indene) resins or polyvinyl butyl ether, combustible materials (for fumigants), for example zinc dust or dicyandiamide, oxygen-yielding substances, for example perchlorates, nitrites or dichromates, phytotoxicity-reducing substances, for example zinc sulfate, ferrous chloride or copper nitrate, substances for prolonging the biological effect, for example chlorinated terphenyls, emulsion-stabilizing substances, for example casein, gum tragacanth and carboxymethyl cellulose (polyvinyl alcohol also being suitable for this purpose), and synergistic agents.

The novel compounds may be applied in the form of particular dosage preparations for specific application made therefrom, such as solutions, liquors, emulsions, suspensions, wettable powders, wettable tablets, soluble powders, pastes, dusts, granules, fumigating agents and smoking agents which are thus ready for application in any usual manner, for instance by spraying such as liquid spraying, misting, atomizing, dusting, scattering, watering, pouring, fumigating, soil application such as mixing, sprinkling, vaporizing and irrigating, surface application such as painting, banding and dressing (dust-coating), dipping and baiting.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–20%, preferably 0.005–10%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.005–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 30 to 10,000 g./hectare, preferably 300 to 6000 g./hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects, acarids and nematodes, which comprises applying to at least one of correspondingly (a) such insects, (b) such acarids, (c) such nematodes, and (d) the corresponding habitat thereof, i.e. the locus to be protected, a correspondingly combative or toxic amount, i.e. an insecticidally, acaricidally or nematocidally effective amount of the particular active compound of the invention alone or together with a carrier vehicle as noted above.

It will be realized, of course, that the concentration of the particular active compound utilized in admixture with the carrier vehicle will depend upon the intended application. Therefore, in special cases it is possible to go above or below the aforementioned concentration ranges.

The preparation of the particular new compounds of dithiolate, having a refractive index $n_D^{20}$ of 1.5690 and

TABLE I

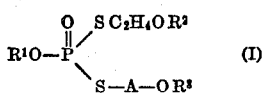

| Compound number | R¹ | A | R² | R³ | Physical constants |
|---|---|---|---|---|---|
| 1 | CH₃ | C₂H₄ | C₂H₅ | C₂H₅ | $n_D^{20}$ 1.5107 |
| 2 | C₂H₅ | C₂H₄ | CH₃ | CH₃ | $n_D^{20}$ 1.5152 |
| 3 | C₂H₅ | C₂H₄ | CH₃ | C₂H₅ | $n_D^{10}$ 1.5039 |
| 5 | C₂H₅ | C₂H₄ | C₂H₅ | C₃H₇-iso | $n_D^{20}$ 1.4984 |
| 6 | C₂H₅ | C₂H₄ | C₃H₇-iso | C₃H₇-iso | B.P. 145–149° C./0.1 mm. Hg; $n_D^{20}$ 1.4900 |
| 7 | C₂H₅ | C₂H₄ | C₄H₉-n | C₄H₉-n | $n_D^{20}$ 1.4881 |
| 8 | C₂H₅ | CH₂ | C₂H₅ | —C₆H₄—Cl | $n_D^{20}$ 1.5535 |
| 9 | C₂H₅ | CH₂ | C₂H₅ | —C₆H₃(Cl)—Cl | $n_D^{20}$ 1.5639 |
| 10 | C₂H₅ | C₂H₄ | C₂H₅ | —C₆H₅ | $n_D^{20}$ 1.5413 |
| 11 | C₂H₅ | C₂H₄ | C₂H₅ | —C₆H₄—Cl (o) | $n_D^{20}$ 1.5572 |
| 12 | C₂H₅ | C₂H₄ | C₂H₅ | —C₆H₄—Cl (p) | $n_D^{20}$ 1.5541 |
| 13 | C₂H₅ | C₂H₄ | C₃H₇-iso | Same as above | $n_D^{20}$ 1.5520 |
| 14 | CH₃ | C₂H₄ | C₂H₅ | —C₆H₃(Cl)—Cl | $n_D^{20}$ 1.5770 |
| 16 | C₂H₅ | C₂H₄ | C₂H₅ | —C₆H₂(Cl)(Cl)—Cl | $n_D^{20}$ 1.5780 |
| 17 | C₂H₅ | C₂H₄ | C₂H₅ | —C₆H₄—C₄H₉-tert | $n_D^{20}$ 1.5350 |
| 18 | C₂H₅ | C₂H₄ | C₂H₅ | —C₆H₃(CH₃)—Cl | $n_D^{20}$ 1.5575 |
| 19 | C₂H₅ | C₂H₄ | C₂H₅ | —C₆H₄—NO₂ | $n_D^{20}$ 1.5695 |
| 20 | C₂H₅ | C₃H₆ | C₂H₅ | —C₆H₅ | $n_D^{20}$ 1.5414 | outstanding activity are illustrated, without limitation, by the following examples:

EXAMPLE 1

27 g. of potassium O-ethyl-S-(β-ethoxyethyl)dithiophosphate were dissolved in 100 ml. of ethanol and 27 g. of 2,4-dichlorophenoxyethyl bromide were added to the solution. Then, the mixture was agitated at 75° C. for 3 hours to complete the reaction. The resulting inorganic salt was separated by filtration, and the ethanol was distilled off from the filtrate under reduced pressure. 150 ml. of benzene were added to the residue, and the mixture was washed with water and 1% potassium carbonate, and dried over anhydrous sodium sulfate. Distillation of benzene gave 37 g. of a colorless oil, O-ethyl-S-(β-ethoxyethyl) - S - [β - (2,4-dichlorophenoxy)ethyl] phosphorodithiolate, having a refractive index $n_D^{20}$ of 1.5690 and having the formula:

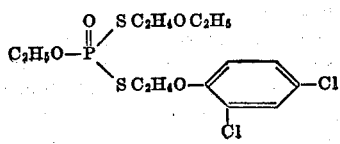

(15)

EXAMPLE 2

A mixture of 10.6 g. of β-ethoxyethyl mercaptan, 10.1 g. of triethylamine and 150 ml. of benzene was cooled to below 5° C. and 16.3 g. of O-ethylphosphoric acid dichloride were added dropwise to the mixture with agitation. After completion of the dropwise addition the temperature of the mixture was gradually raised and the mixture was agitated at 70° C. for 1 hour to complete the reaction. The reaction mixture was then cooled to room temperature, washed with water, 1% hydrochloric acid and 1% potassium carbonate, and dried over anhydrous sodium sulfate. Distillation of benzene gave 26 g. of O-ethyl - S,S - di - (β - ethoxyethyl) phosphorodithiolate boiling at 141–144° C. under 0.1 mm. Hg, having a refractive index $n_D^{20}$ of 1.5000 and having the formula:

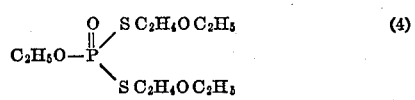

(4)

EXAMPLE 3

Compounds synthesized by similar methods to those of the foregoing examples are shown in Table 1.

The pesticidal compositions of this invention are illustrated in and by the following examples, in which the active compounds are identified by the numbers assigned to them in Examples 1-3.

EXAMPLE 4

15 parts of Compound No. 20, 80 parts [1] of a 1:5 mixture of diatomaceous earth and kaolin and 5 parts of an emulsifier "Runnox" (a polyoxyethylene alkyaryl ether) were ground and mixed together to form a wettable powder. It was diluted to 0.05% before application.

EXAMPLE 5

30 parts of Compound No. 4, 30 parts of xylene, 30 parts of "Kawakazol" (a high-boiling-point aromatic hydrocarbon), and 10 parts of an emulsifier "Sorpol" (a polyoxyethylene alkylaryl ether) were mixed with stirring to form an emulsifiable preparation. It was diluted to 0.05% with water before application.

EXAMPLE 6

2 parts of Compound No. 5 and 98 parts of a 1:3 mixture of talc and clay were ground and mixed together to form a dust. This was applied by scattering via dusting equipment.

EXAMPLE 7

1.5 parts of Compound No. 19, 2 parts of an organic phosphoric acid ester [2], 0.5 part of isopropyl hydrogen phosphate and 96 parts of a 1:3 mixture of talc and clay were ground and mixed together to form a dust. This was applied by scattering via dusting equipment.

EXAMPLE 8

25 parts of water were added to a mixture of 10 parts of Compound No. 8, 10 parts of bentonite, 78 parts of a 1:3 mixture of talc and clay and 2 parts of lignin sulfonate. The resulting mixture was intimately blended and finely divided by means of an extruding granulator to obtain granules of 20-40 mesh, followed by drying at 40-50° C. The resulting granules were applied by spraying.

EXAMPLE 9

95 parts of clay particles of a size distribution of 0.2-2

[1] The term "parts" used in the Examples (4) to (10) means weight.
[2] O,O-dimethyl - O - (3 - methyl-4-methylmercaptophenyl) phosphorothioate.

mm. were put into a rotary mixer and a solution of 5 parts of Compound No. 6 in an organic solvent was sprayed onto the particles being rotated, thereby wetting the particles homogeneously. The particles were then dried at 40-50° C. to form coated granules. They were applied by spraying.

EXAMPLE 10

0.5 part of Compound No. 12, 20 parts of "Velsicol" (a high-boiling-point aromatic hydrocarbon) and 79.5 parts of "Deobase" (deodorized kerosene) were mixed with stirring to form an oil preparation. It was applied by spraying.

The excellent pesticidal activity of the compounds of this invention is illustrated in and by the following test examples, in which the active compounds are identified by the numbers assigned to them in Examples 1-3.

EXAMPLE 11

Test on effects against tobacco cutworm larvae

Preparation of sample formulation:

Solvent: 3 parts by weight of dimethyl formamide
Emulsifier: 0.1 part by weight of alkylaryl polyglycol ether In order to prepare a suitable formulation of an active compound, one part by weight of the active compound was mixed with the above amount of the solvent containing the above amount of the emulsifier, and the mixture was diluted with water to form an aqueous formulation containing the active compound at a prescribed concentration.

Test procedure.—Sweet-potato leaves were dipped in a formulation of an emulsifiable liquor containing the active compound at the prescribed concentration, and they were then dried in air and placed in a 9 cm. diameter Petri dish. Then 10 third-instar tobacco cutworm (*Prodenia litura*) larvae were put into the dish and the dish was kept in a thermostat chamber maintained at 28° C. After 24 hours had passed, the number of dead larvae was counted and the killing ratio was calculated. The results are shown in Table 2.

TABLE 2

| Compound number: | Killing ratio—Active ingredient concentration of— | |
|---|---|---|
| | 300 p.p.m. | 100 p.p.m. |
| 1 | 100 | 100 |
| 2 | 100 | 100 |
| 3 | 100 | 100 |
| 4 | 100 | 100 |
| 5 | 100 | 100 |
| 6 | 100 | 100 |
| 7 | 100 | 100 |
| 8 | 100 | 80 |
| 9 | 100 | 40 |
| 10 | 100 | 100 |
| 11 | 100 | 70 |
| 12 | 100 | 60 |
| 13 | 100 | 60 |
| 14 | 100 | 20 |
| 15 | 100 | |
| 16 | 100 | 10 |
| 17 | 100 | 30 |
| 18 | 100 | 50 |
| 19 | 100 | 70 |
| 20 | 100 | 80 |

TABLE 2—Continued

| | Killing ratio—Active ingredient concentration of— | |
|---|---|---|
| | 300 p.p.m. | 100 p.p.m. |
| Compound: | | |
| (A) | 0 | 0 |
| (B) | 10 | 0 |
| (C) | 0 | 0 |
| (D) | 0 | 0 |
| (E) | 10 | 0 |
| (F) | 10 | 0 |
| (G) | 0 | 0 |
| (H) | 0 | 0 |
| (I) | 10 | 0 |
| Sumithion* | 80 | 10 |

NOTES:

Compound:

(B):
$$\begin{array}{c} C_2H_5O \\ \phantom{xx} \diagdown \phantom{xx} O \\ \phantom{xxxxx} P-S-CH_2CH_2-O-\langle\phantom{x}\rangle \\ \phantom{xx} \diagup \phantom{xx} \\ C_2H_5OCH_2S \end{array}$$

(C):
$$\begin{array}{c} C_2H_5O \\ \phantom{xx} \diagdown \phantom{xx} O \\ \phantom{xxxxx} P-S-CH_2CH_2-O-\langle\phantom{x}\rangle \\ \phantom{xx} \diagup \phantom{xx} \\ C_2H_5OCH_2CH_2CH_2S \end{array}$$

(D):
$$\begin{array}{c} C_2H_5O \\ \phantom{xx} \diagdown \phantom{xx} O \\ \phantom{xxxxx} P-S-CH_2CH_2-O-\langle\phantom{x}\rangle \\ \langle\phantom{x}\rangle-OCH_2CH_2S \end{array}$$

(E):
$$\begin{array}{c} C_2H_5O \\ \phantom{xx} \diagdown \phantom{xx} O \\ \phantom{xxxxx} P-S-CH_2-O-\langle\phantom{x}\rangle-Cl \\ \phantom{xx} \diagup \phantom{xx} \\ C_2H_5OCH_2S \end{array}$$

(F):
$$\begin{array}{c} C_2H_5O \\ \phantom{xx} \diagdown \phantom{xx} O \\ \phantom{xxxxx} P-S-CH_2-O-\langle\phantom{x}\rangle-Cl \\ \phantom{xx} \diagup \phantom{xx} \\ C_2H_5OCH_2CH_2CH_2S \end{array}$$

(G):
$$\begin{array}{c} C_2H_5O \\ \phantom{xx} \diagdown \phantom{xx} O \\ \phantom{xxxxx} P-S-CH_2-O-\langle\phantom{x}\rangle-Cl \\ \langle\phantom{x}\rangle-OCH_2CH_2S \end{array}$$

(H):
$$\begin{array}{c} C_2H_5O \\ \phantom{xx} \diagdown \phantom{xx} O \\ \phantom{xxxxx} P-S-CH_2-O-C_2H_5 \\ \phantom{xx} \diagup \phantom{xx} \\ C_2H_5OCH_2S \end{array}$$

(I):
$$\begin{array}{c} C_2H_5O \\ \phantom{xx} \diagdown \phantom{xx} O \\ \phantom{xxxxx} P-S-CH_2CH_2CH_2-O-C_2H_5 \\ \phantom{xx} \diagup \phantom{xx} \\ C_2H_5OCH_2CH_2CH_2S \end{array}$$

*Sumithion = O,O-dimethyl-O-(3-methyl-4-nitrophenyl)-phosphorothioate, commercially available comparison.

EXAMPLE 12

Test on effects against house-flies

Test procedure.—A sheet of filter paper was spread in a Petri dish of 9 cm. diameter and 1 ml. of an aqueous formulation containing the active compound at the prescribed concentration and prepared in the same manner as in Example 11 was poured into the dish. Then 10 female house-fly imagines were put into the dish and the dish was kept for 24 hours in a thermostat chamber maintained at 28° C. The number of the dead flies was then counted and the killing ratio was calculated. The results are shown in Table 3.

TABLE 3

| | Killing Ratio (percent)—Active ingredient concentration of— | |
|---|---|---|
| | 1,000 p.p.m. | 100 p.p.m. |
| Compound number: | | |
| 2 | 100 | 50 |
| 3 | 100 | 60 |
| 4 | 100 | 95 |
| 5 | 100 | 70 |
| 10 | 100 | 90 |
| 11 | 100 | 50 |
| 12 | 100 | 70 |
| 20 | 100 | 60 |
| Compound (A) | 0 | 0 |

EXAMPLE 13

Test on effects against adzuki bean weevils

Test procedure.—Ten adzuki bean weevils were soaked for 1 minute in an aqueous formulation containing an active compound at a prescribed concentration and which had been prepared in the same manner as in Example 11, and they were then kept in a thermostat chamber maintained at 28° C. The number of dead weevils was counted after 24 hours had passed and the killing ratio was calculated. The results are shown in Table 4.

TABLE 4

| | Killing Ratio (percent)—Active ingredient contration of— | |
|---|---|---|
| | 1,000 p.p.m. | 100 p.p.m. |
| Compound number: | | |
| 2 | 100 | 70 |
| 3 | 100 | 95 |
| 4 | 100 | 100 |
| 5 | 100 | 100 |
| 6 | 100 | 90 |
| 12 | 100 | 80 |
| 15 | 100 | |
| 16 | 100 | 50 |
| 18 | 100 | |
| 19 | 100 | 50 |
| 20 | 100 | 100 |
| Compound (A) | 20 | 0 |

EXAMPLE 14

Test on effects against carmine mites

Test procedure.—Kidney bean having two developing leaves and planted in a 6 cm. diameter pot was infested with 50–100 imagines of the carmine mite. Two days after the infesting, an aqueous formulation of an emulsifiable liquor containing the active compound at a prescribed concentration and which had been prepared in the same manner as in Example 11, was sprayed in an amount of 40 ml. per pot. Each pot was kept in a greenhouse for 10 days and the control effect was evaluated on the following scale:

Index

3—No living imago.
2—Less than 5% of living imagines compared to an untreated control.
1—5–50% of living imagines compared to the untreated control.
0—More than 50% of living imagines compared to the untreated control.

The results are shown in Table 5.

TABLE 5

| | Control effect index | |
|---|---|---|
| | 1,000 p.p.m. | 300 p.p.m. |
| Compound number: | | |
| 4 | 3 | 2 |
| 6 | 3 | 2 |
| 12 | 3 | 3 |
| 19 | 3 | 2 |
| Sappilan* (CPCBS) | 3 | 2 |
| Compound (A) | 0 | 0 |

*Sappilan=Chlorophenyl chlorobenzenesulfonate, commercially available.

EXAMPLE 15

Test on effects against root-knot nematodes

Preparation of sample formulation.—2 parts by weight of an active compound were mixed with 98 parts by weight of talc, and the mixture was ground to form a dust.

Test procedure.—The formulation as prepared above was mixed with soil tainted with sweet-potato root-knot nematodes in an amount such that a prescribed concentration of the active compound was obtained in the soil. The treated soil was stirred and mixed until uniform, and then it was packed into pots each having an area of 1/5000 acre. Thereafter, about 20 tomato seeds (Kurihara variety) were sown per pot and cultivated for 4 weeks in a greenhouse. Then each root was drawn out from the soil without damaging it. The damage degree caused by the nematodes was evaluated with respect to 10 roots as one group based on the following scale.

Damage degree

0—No knots (perfect control).
1—Knots are formed to a slight extent.
2—Knots are formed to a moderate extent.
3—Knots are formed to a considerable extent.
4—Formation of knots is extreme (same as in untreated control).

$$\text{Knot index} = \frac{\Sigma(\text{rank value}) \times (\text{rank population})}{(\text{Whole population examined}) \times 4} \times 100$$

The results are shown in Table 6.

TABLE 6.—EFFECTS AGAINST ROOT-KNOT NEMATODES

| | Knot index (percent) | |
|---|---|---|
| | 30 p.p.m. | 15 p.p.m. |
| Compound number: | | |
| 4 | 0 | 1.7 |
| 6 | 0 | 3.5 |
| Terracur-p* | 0.8 | 15.2 |

*Terracur-p=O,O-diethyl-O-(4-methylsulfinylphenyl)-phosphorothioate.

It will be appreciated that the instant specification and examples are set forth by way of illustration and not limitation, and that various modifications and changes may be made without departing from the spirit and scope of the present invention.

What is claimed is:

1. A method of combating insects, acarids or nematodes which comprises applying to the insects, acarids or nematodes or a habitat thereof an insecticidally, acaricidally or nematocidally effective amount of a phosphoric acid ester of the formula

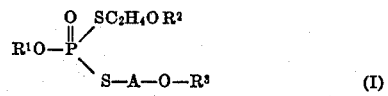
(I)

in which
$R^1$ is methyl or ethyl, $R^2$ is lower alkyl of 1 to 4 carbon atoms,
$R^3$ is lower alkyl of 1 to 4 carbon atoms or

wherein $n$ is 0 to 3 and
X is chlorine, lower alkyl of 1 to 4 carbon atoms or nitro, and
A is lower alkylene of 1 to 4 carbon atoms.

2. The method according to claim 1, in which $R^1$ is methyl or ethyl, $R^2$ is $C_1$—$C_4$ alkyl, $R^3$ is $C_1$—$C_4$ alkyl, phenyl or phenyl substituted chlorine, $C_1$—$C_4$ alkyl or nitro, and A is methylene, ethylene, propylene, trimethylene or tetramethylene.

3. The method according to claim 1, wherein such compound is O-ethyl-S-(β-methoxyethyl)-S-(β-ethoxyethyl) phosphorodithiolate of the formula

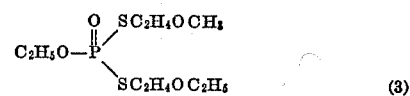
(3)

4. The method according to claim 1 wherein such compound is O-ethyl-S,S-di-(β-ethoxyethyl) phosphorodithiolate of the formula

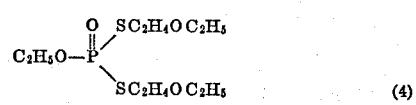
(4)

5. The method according to claim 1 wherein such compound is O-ethyl-S-(β-isopropoxyethyl)-S-(β-ethoxyethyl) phosphorodithiolate of the formula

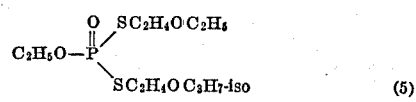
(5)

6. The method according to claim 1 wherein such compound is O-ethyl-S,S-di-(β-isopropoxyethyl) phosphorodithiolate of the formula

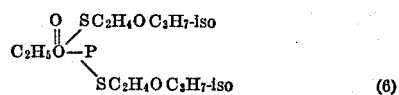
(6)

7. The method according to claim 1 wherein such compound is O-ethyl-S-(β-phenoxyethyl)-S-(β-ethoxyethyl) phosphorodithiolate of the formula

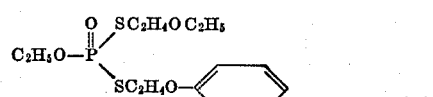
(10)

8. An insecticidal, acaricidal or nematocidal composition comprising an insecticidally, acaricidally or nematocidally effective amount of a phosphoric acid ester of the formula

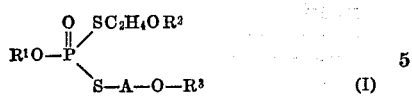

in which
R[1] is methyl or ethyl, R[2] is lower alkyl of 1 to 4 carbon atoms,
R[3] is lower alkyl of 1 to 4 carbon atoms or

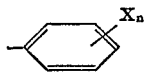

wherein $n$ is 0 to 3 and
X is chlorine, lower alkyl of 1 to 4 carbon atoms or nitro, and
A is lower alkylene of 1 to 4 carbon atoms, in admixture with a diluent.

9. The composition according to claim 8 in which said compound is:
O-ethyl-S-(β-methoxyethyl)-S-(β-ethoxyethyl) phosphorodithiolate,
O-ethyl-S,S-di-(β-ethoxyethyl) phosphorodithiolate,
O-ethyl-S-(β-isopropoxyethyl)-S-(β-ethoxyethyl) phosphorodithiolate,
O-ethyl-S,S-di-(β-isopropoxyethyl) phosphorodithiolate,
O-ethyl-S-(β-phenoxyethyl)-S-(β-ethoxyethyl) phosphorodithiolate,
O-ethyl-S-[β-(4-chlorophenoxy)ethyl]-S-(β-ethoxyethyl) phosphorodithiolate, or
O-ethyl-S-[β-(4-nitrophenoxy)ethyl]-S-(β-ethoxyethyl) phosphorodithiolate.

References Cited
UNITED STATES PATENTS
3,636,144   1/1972   Tsuchiya et al. ____ 260—950 X ALBERT T. MEYERS, Primary Examiner
A. J. ROBINSON, Assistant Examiner

UNITED STATES PATENT OFFICE
CERTIFICATE OF CORRECTION

Patent No. 3,810,983          Dated May 14, 1974

Inventor(s) SHIGEO KISHINO ET AL.

It is certified that error appears in the above-identified patent and that said Letters Patent are hereby corrected as shown below:

Col. 6, line 75, cancel "dithiolate........and" and substitute

-- the present invention and their unexpected superiority and --.

Cols. 7 & 8, Table 1, under heading "A", Compound 2, change "$H_5$" to -- $H_4$ --.

Col. 14, line 29, Claim 2 - after "substituted" insert -- by --;

Signed and sealed this 18th day of March 1975.

(SEAL)
Attest:

RUTH C. MASON
Attesting Officer

C. MARSHALL DANN
Commissioner of Patents
and Trademarks